H. N. EDENS.
TRACTOR.
APPLICATION FILED NOV. 29, 1918.
1,432,446.
Patented Oct. 17, 1922.
3 SHEETS—SHEET 1.
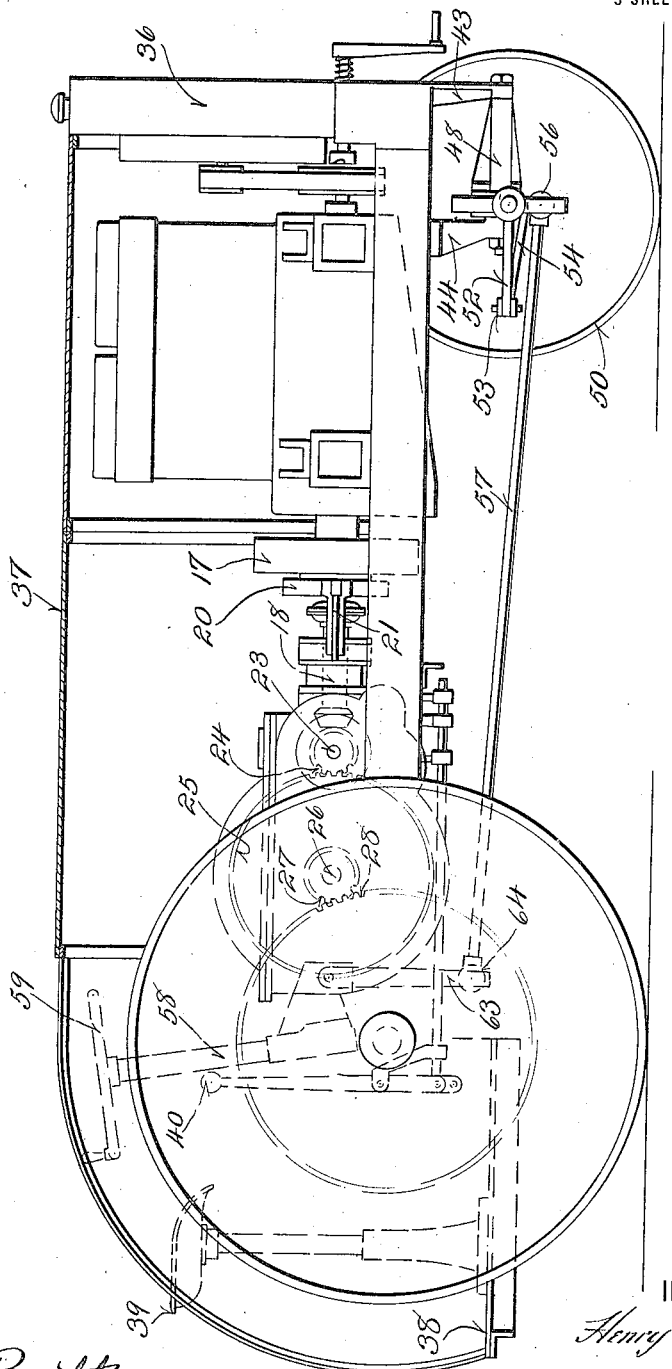
WITNESS:
J. P. Britt
INVENTOR
Henry N. Edens
BY
ATTORNEY

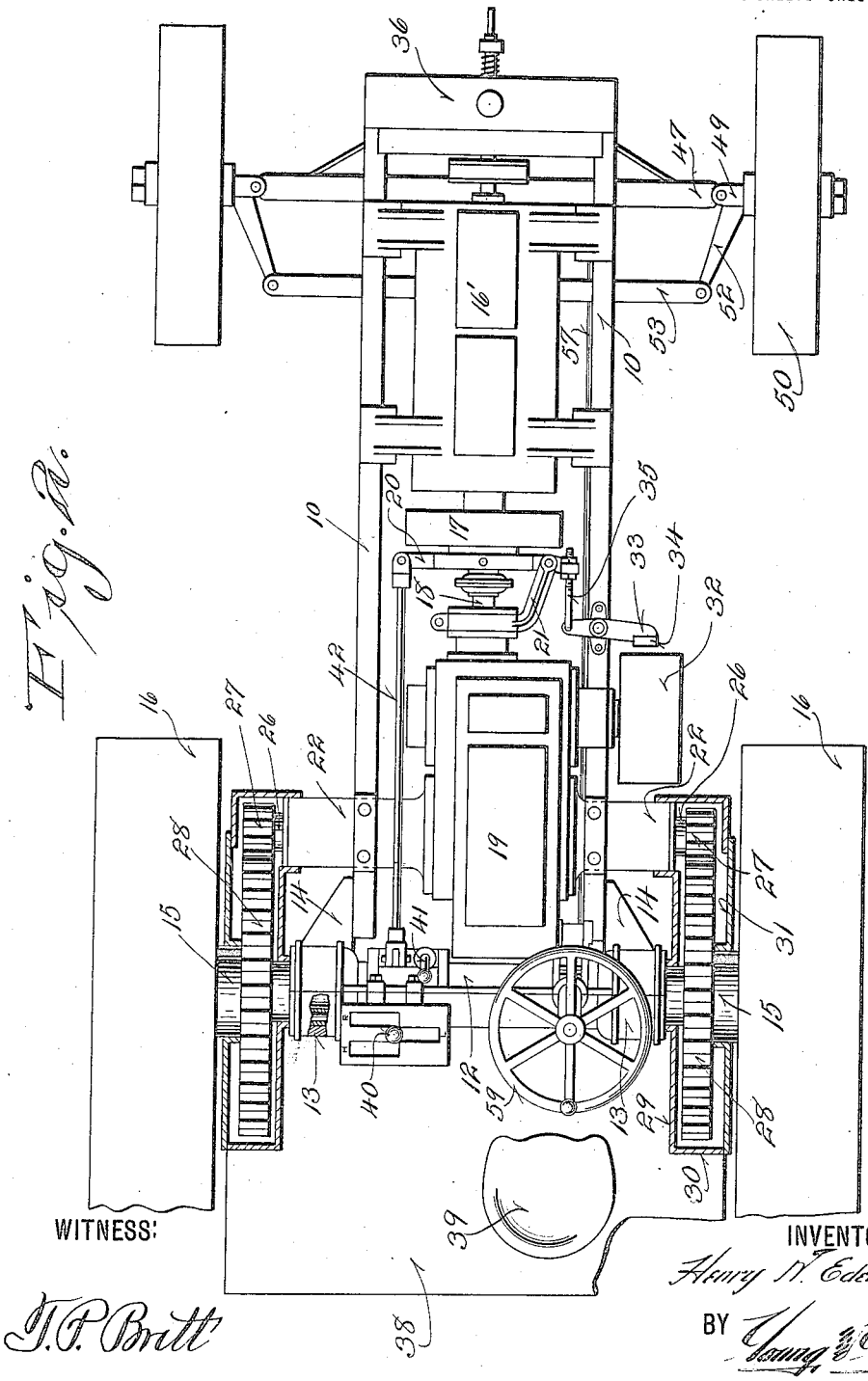

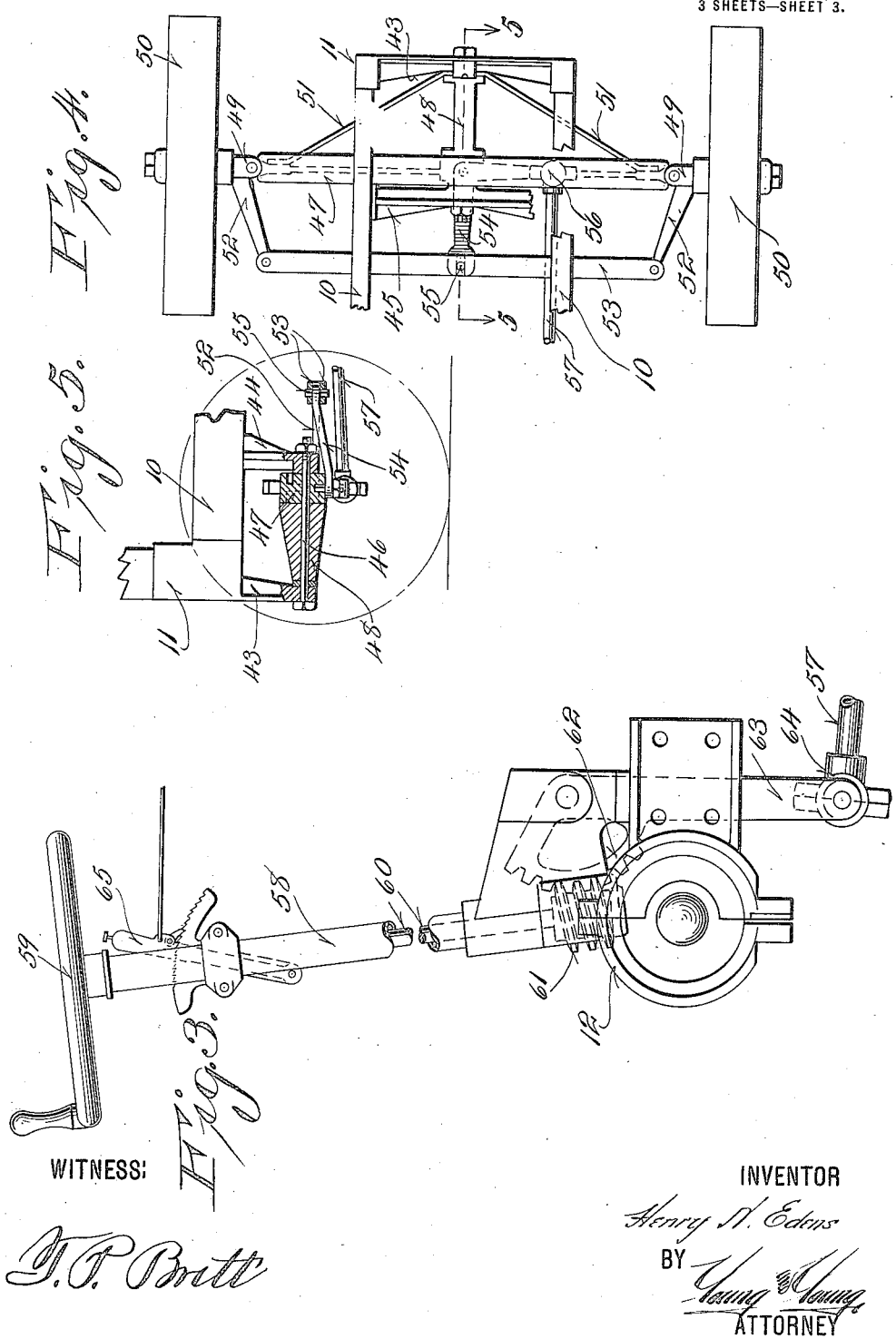

Patented Oct. 17, 1922.

1,432,446

UNITED STATES PATENT OFFICE.

HENRY N. EDENS, OF NEW HOLSTEIN, WISCONSIN, ASSIGNOR TO THE JOHN LAUSON MANUFACTURING COMPANY, OF NEW HOLSTEIN, WISCONSIN.

TRACTOR.

Application filed November 29, 1918. Serial No. 264,586.

*To all whom it may concern:*

Be it known that I, HENRY N. EDENS, a citizen of the United States, and resident of New Holstein, in the county of Calumet and State of Wisconsin, have invented certain new and useful Improvements in Tractors; and I do hereby declare that the following is a full, clear, and exact description thereof.

My invention relates to new and useful improvements in motor driven vehicles, more particularly of that relatively small tractor type adapted for agricultural purposes.

It is in general my object to render such devices more compact and efficient particularly by improving the assemblage relation of their various parts.

A further object resides in the provision of an improved rear wheel drive connection procuring a most compact relation of parts and a maximum distribution of strain.

With the above and other objects and advantages in view, which will be apparent as the description proceeds, my invention resides in the novel features of construction, combination and arrangement of parts as hereinafter more particularly described and defined by the appended claims.

In the accompanying drawings:

Figure 1 is a side elevational view of a tractor embodying my invention, the casing being broken away.

Figure 2 is a plan view of the tractor with the casing removed.

Figure 3 is a detail elevational view of the steering column and associated mechanism.

Figure 4 is a plan view of the dirigible front wheel structure.

Figure 5 is a sectional view therethrough longitudinally of the tractor on the line 5—5 of Fig. 4.

Referring now more particularly to the accompanying drawings, there is provided a main frame or chassis including the side sills 10 and front and rear end sills 11 and 12 respectively, the rear sill 12 comprising in the present instance the connecting portions or sections of a pair of axle bearings 13, these bearing sections being rigidly connected to the rear ends of the sills 10 by angle brackets 14. Axle sections 15 are journaled in the bearings 13 and carry the drive wheels 16, said wheels being of relatively great diameter and width to afford a maximum tread surface.

An engine 16' is mounted on the forward end portion of the frame and carries a fly wheel 17 in which is nested a portion of a conventional clutch mechanism for transmitting power to a shaft 18 projecting from the casing of a combined differential and transmission mechanism 19 of the type disclosed in my co-pending application for patent Serial No. 265,370, filed December 5th, 1918. The clutch includes a spanner lever 20 having one end portion pivoted to a bracket arm 21 projecting forwardly from a collar mounted on the forward end of the differential and transmission casing. This casing is disposed between the sills 10 forwardly of the rear sill 12 and includes lateral drive shaft housing portions projecting across and secured on the sills 10. As shown conventionally in Figure 1, the combined differential and transmission mechanism of my said co-pending application includes a transverse shaft 23 driven from the shaft 18 and having gear connection 24 with a differential master gear 25 of drive shafts 26 journaled in the housing portions 22 and projecting outwardly thereof. The projected ends of the shafts 26 carry gear pinions 27 meshing with gear wheels 28 on the axle sections 15, and each meshing pair of gears is enclosed by a casing including an inner wall 29 receiving the axle section and connected with the axle bearing 13 and with the shaft housing 22, said wall carrying an outwardly extending annulus 30 to which is secured an outer wall 31 having bearing engagement with the axle section. The gears are thus completely enclosed and housed and protected from access of dust or other foreign matter, with but a single bearing connection for the housing.

An exceedingly simple and compact driving connection for the wheels 16 is thus provided, wherein a maximum distribution of operative stresses is afforded, since the weight of the drive mechanism and the stresses incidental to operation thereof are carried directly by the side sills 10 of the main frame and are imparted to the rear axle structure adjacent the ends thereof.

The transverse transmission shaft 23 carries the usual "monkey" pulley 32 from which power may be taken for any desired purpose, and this pulley is in the present instance utilized to afford a brake surface for the drive mechanism. Thus, a brake lever 33 is intermediately pivoted on the adjacent side sill 10 and carries a shoe 34 at its outer end engageable with the periphery of the pulley. The inner end of the lever is connected by a link 35 with the extended pivot end of the clutch lever 30 so that as the clutch lever is moved to opening position, the brake shoe 34 will be applied to the pulley.

The usual radiator 36 is supported on the forward end of the main frame, and an arched casing 37 extends rearwardly from the radiator over the engine and the transmission and differential mechanisms and associated parts. It is noted that the width of the frame and consequently of the casing is very slight, being only sufficient to accommodate the engine 16 and the mechanism 19, the width of the frame being less than half the distance between the front or rear sills so that a maximum stability is procured with a minimum expenditure of frame and supporting material, this slight width of the frame also providing ample clearance for the gear connections of the rear wheels. A platform 38 is carried by the main frame and extends rearwardly thereof between the drive wheels 16. A suitable operator's seat 39 is mounted on this platform and within convenient control of an operator on said seat are located the transmission lever 40 and the clutch lever 41, the particular mounting of said levers being not material to my present invention and being shown more particularly in my co-pending application for patent. The clutch lever 41 is connected by a link 42 with the clutch spanner lever 20 and thus the clutch lever 41 also serves to operate the brake shoe 34.

Entering now into the front wheel structure of the tractor, a hanger bracket 43 depends centrally from the front end sill 11 of the main frame and a second V-shaped hanger bracket 44 has its ends secured to the inwardly spaced side sill portions of the frame. A shaft 46 is mounted in these hanger brackets. A front channel axle 47 has its central portion thickened and mounted on the shaft 46 and is held adjacent the rear hanger bracket 44 by a spacer block 48 mounted on the shaft. Steering knuckles 49 are mounted at the ends of the shaft and carry the front wheels 50 of the tractor, these front wheels being of considerably lesser diameter than the drive wheels 16, and it is noted that the axis of the drive wheels 16 is located substantially within the general plane of the main frame or chassis, while the axes of the front wheels are located a considerable distance below said frame. The end portions of the front axle 47 are braced by an angular bar 51 having its end portions secured thereto, and having its intermediate portion mounted on the axle pivot shaft 46 between the spacer block 48 and the front hanger bracket 43.

For steering the wheels 50, arms 52 project rearwardly from the steering knuckles and are connected by a pair of links 53. An angle lever 54 is pivoted at its angle to the central portion of the axle and one arm of the lever extends rearwardly and projects between the links 53 and is bifurcated for sliding reception of a pin 55 passed through the links. The other arm of the lever extends in the direction of the axle and is connected by a universal joint 56 with a link 57 which extends longitudinally under the tractor frame to the rear portion thereof. A steering column 58 is mounted in any suitable manner and rises from the rear frame sill 12 in advance of the operator's seat 39, and mounts a steering wheel 59 connected with a shaft 60 in the column which carries at its lower end a worm 61 meshing with a worm gear segment 62 pivoted in advance of the column and carrying a depending rocker arm 63 having universal connection 64 with the steering gear link 57.

A steering connection for the front wheels is thus afforded which permits free independent vertical movement by tilting of the axle 47 to compensate for irregularities of ground over which the tractor travels. It is particularly noted that by reason of the long link 57 extending from the front axle to the rear of the frame, the axle connected end of said link moves in a slight arc, and the free tilting movement of the axle is also facilitated by the central positioning of the lever 54. The steering column 58 preferably mounts a fuel control lever 65, the connections of which are not material to the present invention.

What is claimed is:

1. A tractor comprising a main frame having front and rear wheels, a transmission mechanism carried by the frame and including a transversely extending shaft having a power pulley thereon, drive connections including a differential between said shaft and the rear wheels, a motor, a clutch connection between the motor and the transmission mechanism, a brake engageable with the power pulley, and means for opening the clutch and simultaneously applying said brake.

2. A tractor of the class described including a main frame, wheels supporting the forward end of the frame, drive wheels supporting the rear end of the frame, a transmission mechanism carried by the frame and including a lateral shaft and drive connections with the rear wheels, a power pulley on said lateral shaft, means for driving the rear wheels through said transmission mechanism, a clutch connection between the transmission mechanism and the last mentioned means comprising a rocking lever, and a brake member engageable with the power pulley and connected with the clutch connection for operation therewith.

In testimony that I claim the foregoing I have hereunto set my hand at New Holstein, in the county of Calumet and State of Wisconsin.

HENRY N. EDENS.